United States Patent [19]

Heppner

[11] Patent Number: 5,141,058
[45] Date of Patent: Aug. 25, 1992

[54] ROCK PICKING MACHINE

[76] Inventor: Alden Heppner, P.O. Box 348, Lac La Biche, Alberta, Canada, T0A 2C0

[21] Appl. No.: 628,016

[22] Filed: Dec. 17, 1990

[30] Foreign Application Priority Data

Jun. 1, 1990 [CA] Canada ............................... 2018120

[51] Int. Cl.⁵ ............................................ A01B 43/00
[52] U.S. Cl. ..................................... 171/63; 171/107; 171/120; 198/511; 198/520
[58] Field of Search ...................... 171/63, 64, 65, 102, 171/105, 107, 117, 120; 37/2 R; 56/327.1, 328.1; 198/308.1, 310, 318, 511, 520

[56] References Cited

U.S. PATENT DOCUMENTS

| 1,454,668 | 5/1923 | Bugla | 171/63 |
| 2,860,426 | 11/1958 | Allin, Jr. et al. | 171/105 |
| 3,596,717 | 8/1971 | Knudsen | 171/63 |
| 3,739,855 | 6/1973 | Bliss | 171/63 |
| 3,921,375 | 11/1975 | Cetrulo, Jr. | 56/327.1 |
| 4,050,518 | 9/1977 | Gilmour | 171/63 |
| 4,200,408 | 4/1980 | Babler et al. | 198/318 |
| 4,221,265 | 9/1980 | Pratt | 171/63 |
| 4,313,502 | 2/1982 | Nelson | 171/63 |
| 4,593,426 | 6/1986 | Chrisley | 171/63 |

FOREIGN PATENT DOCUMENTS

699748 12/1964 Canada .
63283 12/1948 Netherlands ................. 171/120

OTHER PUBLICATIONS

Brochure—Schulte RS320 Rock Picker.
Pami Evaluation Report on Schulte RSH-4 Semi-High Lift Rock Picker.

*Primary Examiner*—Randolph A. Reese
*Assistant Examiner*—Spencer Warnick
*Attorney, Agent, or Firm*—Beveridge, DeGrandi & Weilacher

[57] ABSTRACT

An improvement in a rock picking machine having a frame with ground wheels supporting the frame, a table with a grate over which rocks are moved and discharged into a bucket rearwardly pivotally mounted on the frame, and a conveyer forwardly pivotally mounted on the table for moving rocks up the grate. The improvement consists of at least one forwardly and upwardly extending member positioned at a rearward end of the conveyer frame. The member forms a wedge shaped cavity. As large rocks are moved up the grate by the conveyer through the wedge shaped cavity, the rocks engage the member thereby lifting the rearward end of the conveyer frame to provide clearance.

7 Claims, 5 Drawing Sheets

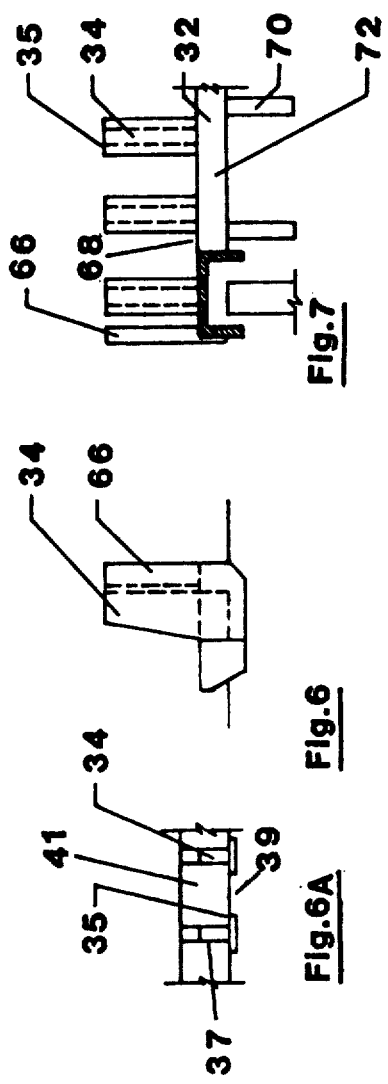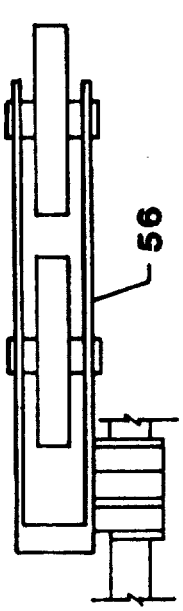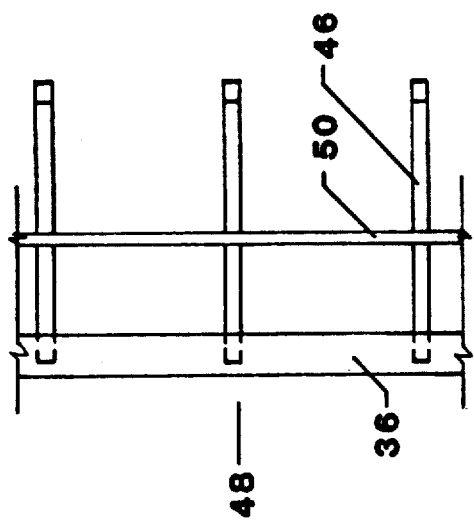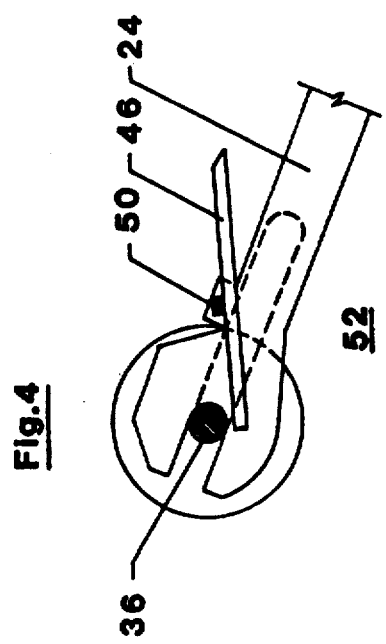

ROCK PICKING MACHINE

The present invention relates to an improvement in a rock picking machine.

BACKGROUND OF THE INVENTION

The present invention relates to improvements for a rock picking machine originally designed by John Schulte, as described in Canadian Patent 699,748. The Schulte machine is subject to "jamming" by rocks and soil retention under certain conditions. Some of these conditions are outlined in Evaluation Report Number E3880B published by the Prairie Agricultural Machinery Institute (PAMI) in September of 1981. The PAMI Evaluation Report on page 4 identifies a "jamming" problem with respect to large rocks; "Rocks larger than 520 mm (20 in.) would not pass between the conveyer crossmember and the grate." In order to avoid problems of soil retention, the PAMI Evaluation Report made recommendations with respect to operating depth and field preparation. The suggested operating depth was "with the grate just touching the soil surface". The short comings of this suggested operating depth was described on page 4 as follows; "This was adequate for removing rocks lying on the surface, however, partially buried rocks were pushed back into the soil by the grate." The suggested field preparation for best performance was "in fields with a firm base and a minimum amount of trash or dirt lumps." The Applicant has found that operating at the recommended operation depth sometimes results in rocks jamming between the conveyer teeth and the forward edge of the grate. The PAMI Evaluation Report also indicated some "jamming" which occurred with small rocks. In most cases these jammed rocks could be removed by reversing the conveyer. However, small rocks "sometimes jammed between the conveyer bat teeth and the rear of the grate, preventing the conveyer from being reversed". Another type of "jamming" noted by the Applicant is by rocks which, instead of remaining in the bucket, are carried by the cross bar to a position where they jam the conveyer.

SUMMARY OF THE INVENTION

What is required is some modifications to the Schulte rock picking machine which will address one or more of the problems described.

The Schulte rock picking machine has a frame with ground wheels supporting the frame, and embodying a grate over which rocks are moved and discharged into a bucket rearwardly pivotally mounted on the frame. A table on which the grate is mounted is rearwardly pivoted on the frame to be movable between a rock picking position in relation to the ground and a position elevated from the ground. A conveyer is forwardly pivotally mounted on the table for moving rocks up the grate. The conveyer includes a frame with sprocket wheels rotatably mounted on the conveyer frame. Chains are trained over aligned sprocket wheels and conveyer cross bars are fixed to the chains at intervals. Teeth on the cross bars engage and move rocks up the grate. Means are provided for driving the sprocket wheels.

According to one aspect of the invention there is provided an improvement which is comprised of at least one forwardly and upwardly extending member positioned at a rearward end of the conveyer frame. The member forms a wedge shaped cavity. As large rocks are moved up the grate by the conveyer through the wedge shaped cavity, the rocks engage the member thereby lifting the rearward end of the conveyer frame to provide clearance.

This improvement addresses the problem which previously existed with the Schulte rock picker of large rocks jamming between the grate and the conveyer frame. The conveyer frame as modified will now be lifted as the large rock passes up the grate to provide such clearance as may be necessary to avoid jamming.

According to another aspect of the invention there is provided an improvement which is comprised of an extension to the conveyer which extends forwardly of the table substantially parallel to the groundsurface when the table is in a rock picking position, such that the crossbars travel in a substantially horizontal path prior to encountering the grate.

This improvement addressed the problem which previously existed of rocks jamming between the teeth and a forward end of the grate. The modification changes the angle of attack on the teeth of the crossbars. As modified, the teeth draw rocks from the ground surface in front of the grate toward the grate. With the Schulte rock picking machine the teeth traveled along a path dictated by the circumference of the sprocket and the contact area between the teeth and the ground surface was limited.

According to another aspect of the invention there is provided an improvement which is comprised of a plurality of forwardly and downwardly extending ground chisels positioned at the forward end of the table. The ground chisels engage the groundsurface to direct rocks below the surface to the grate.

This improvement addresses the dilemma presented to the operator of the Schulte rock picking machine of either operating the machine with the grate just touching the soil surface and have partially buried rocks pushed back into the soil by the grate, or operating the machine with the grate set below the soil surface and having an unacceptable quantity of soil retention. The ground chisels do not retain soil, but do direct the rocks partially below the surface to the grate.

According to another aspect of the invention there is provided an improvement which is comprised of a wiper blade secured to each end of the crossbars which extends forward of the teeth, such that the wiper blade directs rocks away from the ends of the crossbar.

This improvement addresses the problem of small rocks being jammed between the conveyer bat teeth and the grate. As modified, the wiper blades direct small rocks away from the edges of the grate where they can become jammed.

According to another aspect of the invention there is provided an improvement which is comprised of a plurality of spacer members secured to a side of the cross bars opposite the teeth, thereby preventing rocks of a size sufficient to cause a jamming of the machine from resting upon and being lifted by the opposed side of the crossbars.

This improvement addresses the problem of rocks being carried by the cross bars into a position where they jam the operation of the conveyer. As modified, the spacer bars occupy the space on the opposite side of the cross bar so that there is simply not sufficient room for a rock which is of a sufficient size to create a jam.

According to another aspect of the invention there is provided an improvement which is comprised of each of the teeth on the cross bars for engaging and moving rocks up the grate being generally "T" shaped with a top portion that engages rocks and a tail portion. A first clearance space is provided between adjacent top portions. A second clearance space is provided between adjacent tail portions. The second clearance space is larger than the first clearance space such that once a rock passes through the first clearance space increased clearance is encountered in the second clearance space thereby reducing the likelihood of the rock jamming between the adjacent teeth.

This improvement addresses the problem of rocks jamming between the teeth on the crossbars. In the prior art the teeth were substantially uniform in cross-section. Rocks would get part way between the teeth and jam. Once jammed they often had to be dislodged using a sledge hammer and metal chisel. With the improvement the jamming of rocks is virtually eliminated. If the top portions of the "T" shaped teeth are able to hold the rocks, the rocks are conveyed to the bucket. If the rocks work their way through the first clearance space between the top portions of the "T" shaped teeth, they pass unimpeded through the larger second clearance space without jamming the equipment.

BRIEF DESCRIPTION OF THE DRAWINGS

These and other features of the invention will become more apparent from the following description in which reference is made to the appended drawings wherein:

FIG. 4 is a detailed top plan view of a modification at the rearward end of the conveyer.

FIG. 5 is a detailed section view of the modification illustrated in FIG. 4.

FIG. 6 is a detailed side elevation view of a modification on the cross bars.

FIG. 6A is a detailed top plan view of a modification to the teeth positioned on the cross bars.

FIG. 7 is a detailed front elevation view of the modification illustrated in FIG. 6.

FIG. 8 is a detailed top plan view of a forward extension of the conveyer.

FIG. 9 is a detailed side elevation view of the forward extension of the conveyer illustrated in FIG. 8.

DETAILED DESCRIPTION OF THE PREFERRED EMBODIMENT

Figure 1:
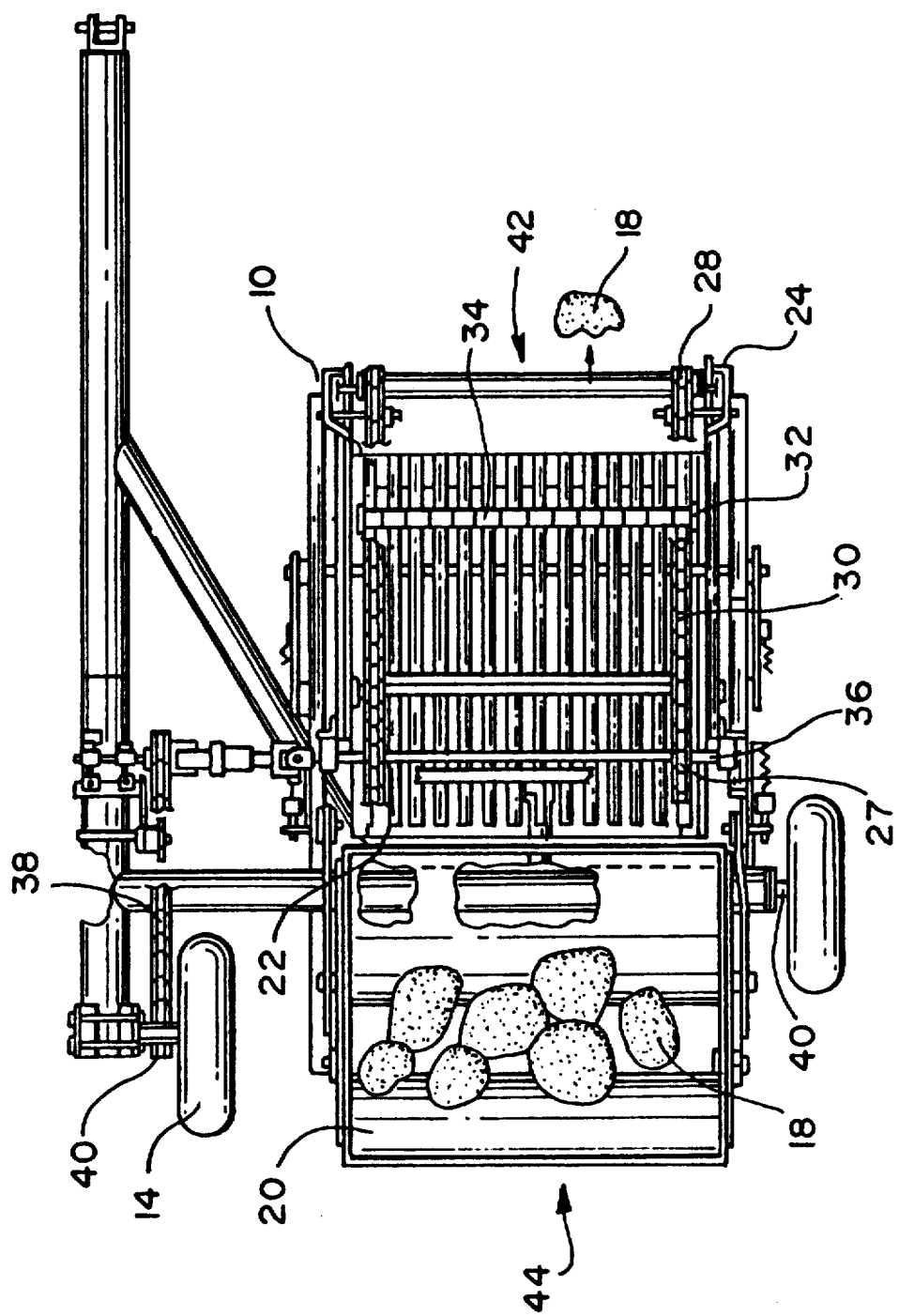
FIG. 1 labelled as PRIOR ART, and illustrates the SCHULTE rock picking machine.

The improvements will now be described with reference to FIGS. 1 through 13. The original Schulte rock picking machine, as illustrated in FIG. 1 and labelled as PRIOR ART, is generally designated by reference numeral 10. In order that the significance of the modifications which have been made to the Schulte rock picking machine will be understood the basic structure of the Schulte machine will now be described.

Referring to FIG. 1, rock picking machine 10 has a frame 12 with ground wheels 14 supporting frame 12. A grate 16 is provided over which rocks 18 are moved and discharged into a bucket 20 which is rearwardly pivotally mounted on frame 12. A table 22 is provided on which grate 16 is mounted. Table 22 is rearwardly pivoted on frame 12 and is movable between a rock picking position in relation to the ground and a position elevated from the ground. A conveyer 24 is forwardly pivotally mounted on table 22 for moving rocks up grate 16. Conveyer 24 has a frame 26 with sprocket wheels 27 and 29 rotatably mounted on conveyer frame 26. Chains 30 are trained over aligned sprocket wheels 27 and 29. Conveyer cross bars 32 are fixed to chains 30 at intervals. Teeth 34 on cross bars 32 engage and move rocks 18 up grate 16. A conveyer drive axle 36 is connected by a chain 38 to an axle 40 of one of the wheels 14. As axle 40 rotates the linkage through chain 38 causes conveyer drive axle 36 to rotate. Conveyer drive axle 36 extends through pair of sprocket wheels 27, thereby providing the means for driving sprocket wheels 27 and 29. For the purpose of this description rock picking machine will be considered to have a forward end 42 and a rearward end 44, and the various parts will be described with reference to an orientation toward forward end 42 or rearward end 44.

One of the problems, as previously described, with rock picking machine 10 was its inability to handle rocks of a diameter greater than 20 inches. The specified diameter was the available clearance between grate 16 and conveyer frame 26. Referring to FIGS. 2, 3, 4, and 5, the Applicant has addressed this problem by providing a plurality of forwardly and upwardly extending members 46. Members 46 are positioned at a rearward end 48 of conveyer frame 26. For purposes of reinforcement of members 46 a transverse reinforcement bar 50 is secured to members 46. Members 46 form a wedge shaped cavity 52. The use and operation of members 46 will now be described. As large rocks 18 are moved up grate 16 by conveyer 24 they enter wedge shaped cavity 52. Rocks 18 engage member 46 thereby lifting rearward end 48 of conveyer frame 26 to provide clearance. This is possible due to the fact that in rock picking machine 10, conveyer frame 26 is forwardly pivotally mounted to table 22.

Figure 3:
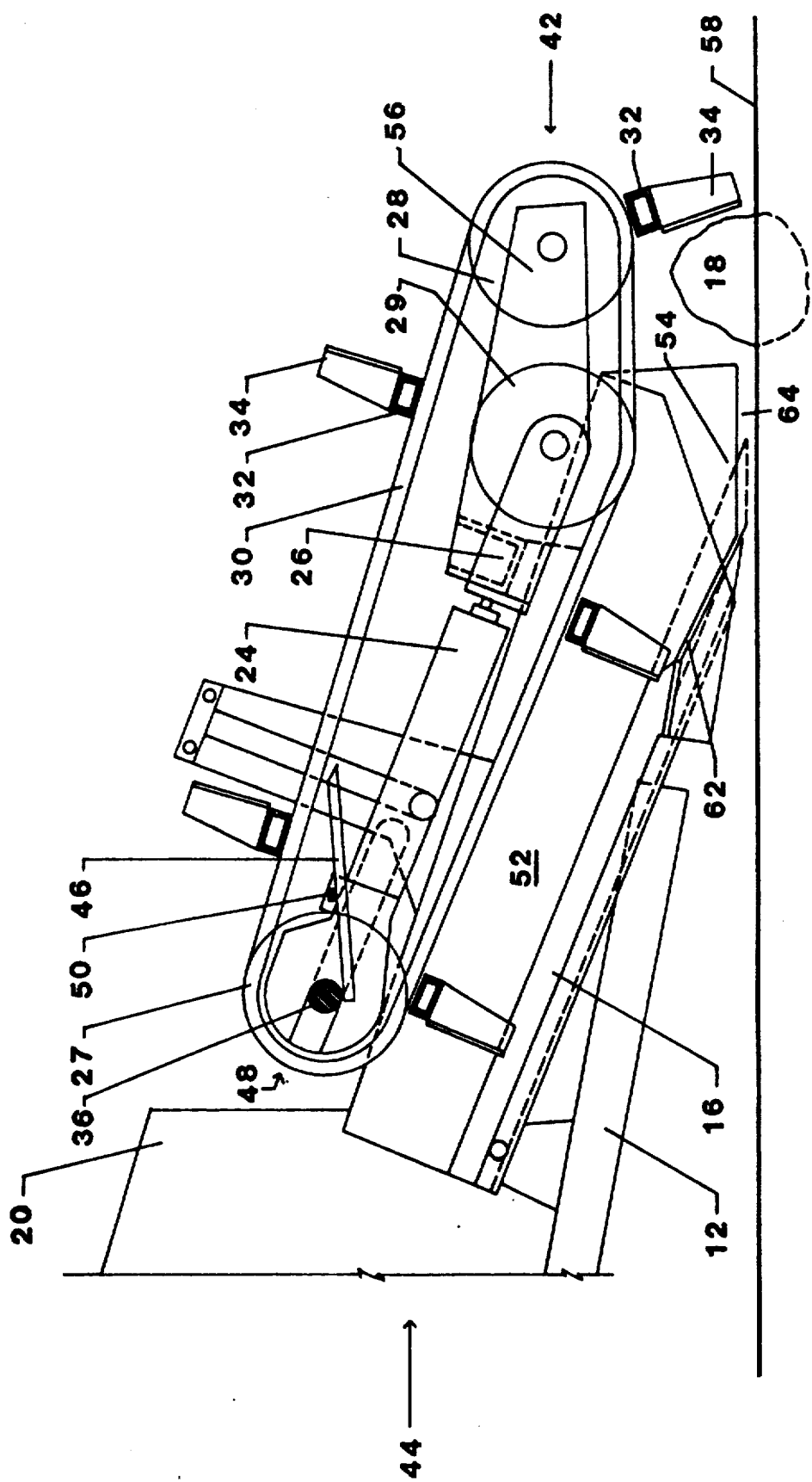
FIG. 3 is a section view taken along section lines 3—3 of FIG. 2.

Another of the problems described with respect to rock picking machine 10, was rocks jamming between teeth 34 and a forward end 54 of grate 16. Whenever rocks 18 are trapped in this position a great bang can be heard as cross bar 32 is carried around sprocket 29 until teeth 34 strike the stationary rock. The Applicant determined that this problem could only be corrected by modifying the angle of attack of teeth 34 with respect to grate 16. With rock picking machine 10 teeth 34 travel along a path dictated by the circumference of sprocket 29 and the contact area between teeth 34 and the ground surface is limited. Referring to FIGS. 3, 8, and 9, the Applicant has addressed this problem by placing an extension 56 on conveyer 24 which extends forwardly of table 22 which supports grate 16 and substantially parallel to groundsurface 58 when table 22 is in a rock picking position. The extension adds two more of sprocket wheels, identified by reference numeral 28, so that chain 30 can extend to a forward end 60 of extension 56. When rock picking machine 10 is in operation, extension 56 permits crossbars 32 travel in a substantially horizontal path prior to encountering grate 16. This allows teeth 34 to draw rocks 18 from ground surface 58 in front of grate 16 toward grate 16. It is virtually impossible for the previously experienced jamming of rocks against forward end 54 of grate 16.

Figure 2:
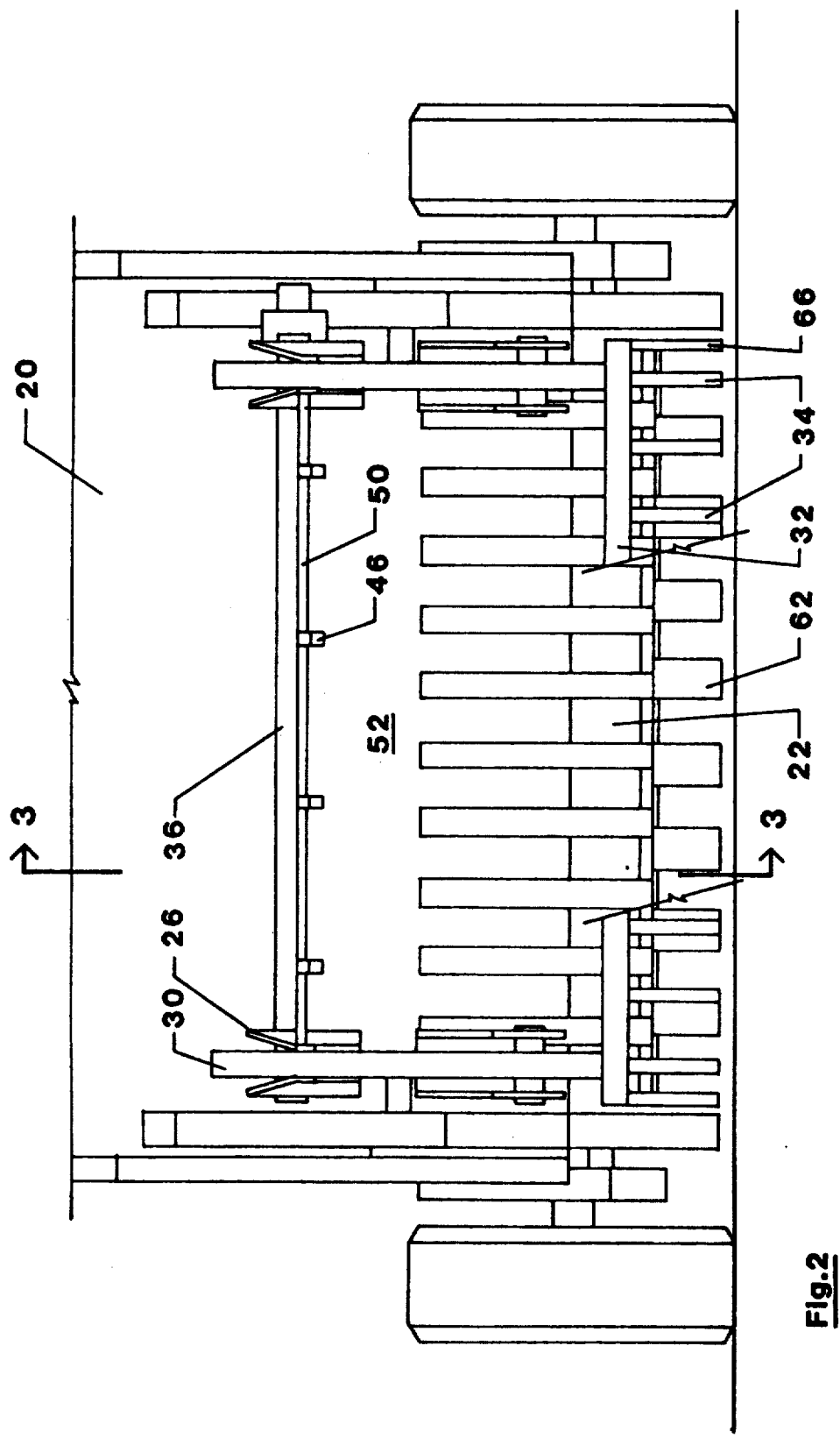
FIG. 2 is a front elevation view of a modified rock picking machine.
Figure 11:
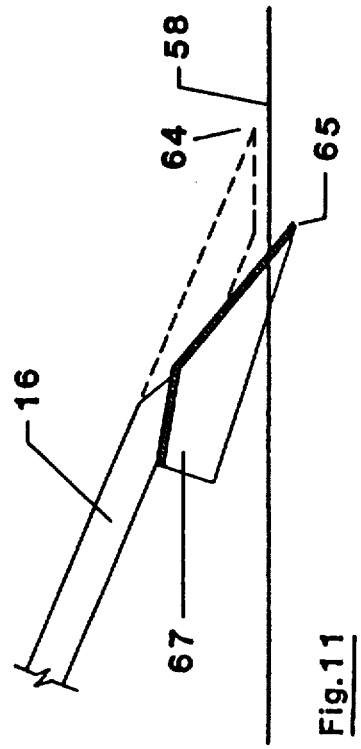
FIG. 11 is a section view of the modification to the forward end of the grate illustrated in FIG. 10.
Figure 10:
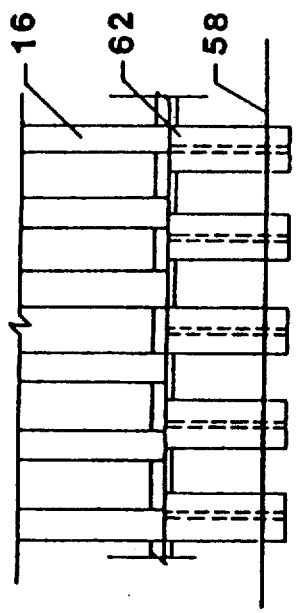
FIG. 10 is a detailed front elevation view of a modification to the forward end of the grate.
Figure 13:
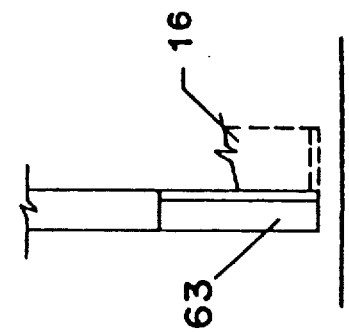
FIG. 13 is a front elevation view of the end of the grate illustrated in FIG. 12.
Figure 12:
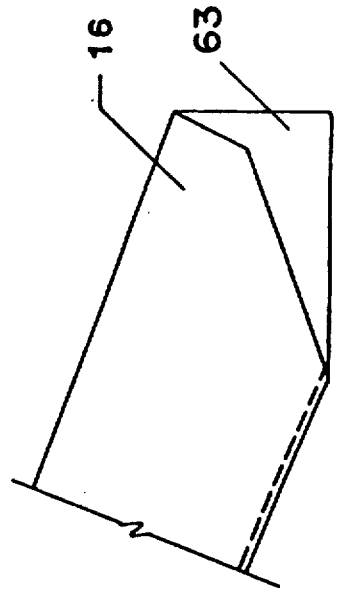
FIG. 12 is a side elevation view of an end of the grate illustrated in FIG. 10.

Another problem described with respect to rock picking machine 10 was grate 16 pushing partially buried rocks 18 back into ground surface 58. This problem could be addressed by operating rock picking machine 10 with grate 16 set below ground surface 58. The PAMI report indicated that grate 16 could be set below ground surface 58 if "the field was not too firm", but "Caution was needed to prevent damage to the grate and frame when working in fields containing large embedded rocks." However, if grate 16 is operated below ground surface 58 an unacceptable quantity of soil retention unavoidably occurs. Referring to FIGS. 2, 10, and 11, the Applicant addressed this problem by having a plurality of forwardly and downwardly extending "T" shaped ground chisels 62 positioned at forward end 64 of table 22. When rock picking machine 10 is in operation ground chisels 62 extend below ground surface 58 to direct rocks 18 below ground surface 58 to grate 16. It is important to note the positioning of ground chisels 62 and why it is preferred that they be "T" shaped, with a top portion 65 and a tail support portion 67. In the prior art, table 22, upon which grate 16 is positioned, skims the ground surface when in the rock picking position. This leads to a build up of earth, especially in view of the placement of transverse reinforcement on the Schulte machine. The presence of ground chisels 62, permits the Applicant to operate his modified rock picking machine with table 22 approximately 5 inches above the groundsurface providing additional clearance for the free passage of dirt and rocks between table 22 and the ground surface. Ground chisels 62 are positioned approximately 3 inches apart, this leaves sufficient room for the free passage of small rocks and dirt. The "T" shape serves an important purpose. Instead of small rocks and dirt building up between ground chisels 62 which must work its way the entire width of a solid ground chisel, the "T" shaped chisel is made out of ⅜ inch plate. The rocks and soil must only work their way a distance of ⅜ of an inch to pass through the obstruction created by top portion 65 and flow around the balance of the "T" shape. The "tail" portions 67 of the "T" shaped chisels are spaced about 6 inches apart. This means that once dirt clears the ⅜th of an inch of steel plate, representing the thickness of top portions 65, the space available for dirt flow increases from 3 inches to 5 inches allowing for the flow of dirt "around" ground chisels 62. The "T" shape allows for sufficient strength while avoiding a build up of earth. A related modification is the use of pointed "splitters" 63 on the forward edges which meet the rocks, as is illustrated in FIGS. 12 and 13. Splitters 63 deflect rocks in either direction so the rock is either in or out. With the Schulte rock picking machine, table 22 had supporting "shoes"; rocks had a tendency to build up under the shoes, thereby lifting the front of the machine.

Another problem described with respect to rock picking device 10 was small rocks jamming between conveyer teeth 34 and the sides of grate 16. Referring to FIGS. 2, 6, and 7, the Applicant had addressed the problem by securing a wiper blade 66 to each end 68 of crossbars 32. Wiper blades 66 extend forward of teeth 34. In order to make this modification the Applicant had to cut away part of grate 60 so wiper blade moved immediately adjacent grate 16 with no room for the entry of small rocks. When rock picking machine 10 is in operation, as cross bars 32 are moved by chains 30 along table 22 which supports grate 16, wiper blades 66 direct rocks away from ends 68 of crossbar 32, and hence away from the edges of grate 16 where they can become jammed by teeth 34 positioned closest to ends 68 of cross bar 32.

Another problem encountered related to rocks jamming between the teeth 34 on cross bars 32. The Applicant addressed this problem by modifying the construction of teeth 34. Referring to FIG. 6A, teeth 34 are generally "T" shaped with a top portion 35 that engages rocks and a tail portion 37. A first clearance space 39 is provided between adjacent top portions 35. A second clearance space 41 is provided between adjacent tail portions 37. Second clearance space 41 is larger than first clearance space 39. Once a rock passes through first clearance space 39 increased clearance is encountered in second clearance space 41 thereby reducing the likelihood of the rock jamming between the adjacent teeth 34.

A final problem described with respect to rock picking machine 10 was that of rocks being carried by cross bars 32 into a position where they jam the operation of conveyer 24. This jam typically occurred between conveyer drive axle 36 and cross bars 32. Referring to FIG. 7, the Applicant has secured a plurality of spacer members 70 to a side 72 of cross bars 32 opposite teeth 34. When rock picking machine 10 is in operation, spacer bars 70 prevent rocks 18 of a size sufficient to cause a jamming of rock picking machine 10 from resting upon and being lifted by opposed side 72 of crossbars 32. Spacer bars 70 occupy the space on opposed side 72 of cross bar 32 so that there is simply not sufficient room for a rock which is of a sufficient size to create a jam.

It will be apparent to one skilled in the art that modifications may be made to the improvements described without departing from the spirit and scope of the invention.

The embodiments of the invention in which an exclusive property or privilege is claimed are defined as follows:

1. An improvement in a rock picking machine having a frame with ground wheels supporting the frame, and embodying a grate over which rocks are moved and discharged into a bucket rearwardly pivotally mounted on the frame, a table on which the grate is mounted being rearwardly pivoted on the frame to be movable between a rock picking position in relation to the ground and a position elevated from the ground, a conveyer forwardly pivotally mounted on the table for moving rocks up the grate, the conveyer including a conveyor frame, sprocket wheels rotatably mounted on the conveyer frame, chains trained over aligned sprocket wheels, conveyer cross bars fixed to the chains at intervals, teeth on the cross bars for engaging and moving rocks up the grate, and means for driving the sprocket wheels, the improvement comprising:

at least one forwardly and upwardly extending member positioned at a rearward end of the conveyer frame which member forms a wedge shaped cavity, such that as large rocks are moved up the grate by the conveyer through the wedge shaped cavity, the rocks engage the member thereby lifting the rearward end of the conveyer frame to provide clearance.

2. An improvement in a rock picking machine having a frame with ground wheels supporting the frame, and embodying a grate over which rocks are moved and discharged into a bucket rearwardly pivotally mounted on the frame, a table on which the grate is mounted being rearwardly pivoted on the frame to be movable between a rock picking position in relation to the ground and a position elevated from the ground, a conveyer forwardly pivotally mounted on the table for moving rocks up the grate, the conveyer including a conveyor frame, sprocket wheels rotatably mounted on the conveyer frame, chains trained over aligned sprocket wheels, conveyer cross bars fixed to the chains at intervals, teeth on the cross bars for engaging and moving rocks up the grate, and means for driving the sprocket wheels, the improvement comprising:

a fixed extension which extends forwardly of the table substantially parallel to the groundsurface when the table is in a rock picking position, the extension rotatably supporting at least one additional sprocket wheel, the additional sprocket wheel being substantially horizontally aligned with one of the sprocket wheels which support the chains to which the conveyor cross bars are fixed such that the teeth on the crossbars travel in a substantially horizontal path prior to encountering the grate.

3. An improvement in a rock picking machine having a frame with ground wheels supporting the frame, and embodying a grate over which rocks are moved and discharged into a bucket rearwardly pivotally mounted on the frame, a table on which the grate is mounted being rearwardly pivoted on the frame to be movable between a rock picking position in relation to the ground and a position elevated from the ground, a conveyer forwardly pivotally mounted on the table for moving rocks up the grate, the conveyer including a conveyor frame, sprocket wheels rotatably mounted on the conveyer frame, chains trained over aligned sprocket wheels, conveyer cross bars fixed to the chains at intervals, teeth on the cross bars for engaging and moving rocks up the grate, and means for driving the sprocket wheels, the improvement comprising:

a plurality of forwardly and downwardly extending ground chisels positioned at the forward end of the table, such that the ground chisels extend below the ground surface to direct rocks below the ground surface to the grate, each of the ground chisels being generally "T" shaped with a top portion that engages soil bearing rocks and a tail portion, a first clearance space being provided between adjacent top portions, a second clearance space being provided between adjacent tail portions, the second clearance space being larger than the first clearance space such that once a rock passes through the first clearance space increased clearance is encountered in the second clearance space thereby allowing soil to pass through freely and reducing the likelihood of the rock jamming between the adjacent teeth.

4. An improvement in a rock picking machine having a frame with ground wheels supporting the frame, and embodying a grate over which rocks are moved and discharged into a bucket rearwardly pivotally mounted on the frame, a table on which the grate is mounted being rearwardly pivoted on the frame to be movable between a rock picking position in relation to the ground and a position elevated from the ground, a conveyer forwardly pivotally mounted on the table for moving rocks up the grate, the conveyer including a conveyor frame, sprocket wheels rotatably mounted on the conveyer frame, chains trained over aligned sprocket wheels, conveyer cross bars fixed to the chains at intervals, teeth on the cross bars for engaging and moving rocks up the grate, and means for driving the sprocket wheels, the improvement comprising:

a wiper blade secured to each end of the cross bars which extends forward of the teeth, such that the wiper blade directs rocks away from the ends of the cross bar.

5. An improvement in a rock picking machine having a frame with ground wheels supporting the frame, and embodying a grate over which rocks are moved and discharged into a bucket rearwardly pivotally mounted on the frame, a table on which the grate is mounted being rearwardly pivoted on the frame to be movable between a rock picking position in relation to the ground and a position elevated from the ground, a conveyer forwardly pivotally mounted on the table for moving rocks up the grate, the conveyer including a conveyor frame, sprocket wheels rotatably mounted on the conveyer frame, chains trained over aligned sprocket wheels, conveyer cross bars for engaging and moving rocks up the grate, teeth on the cross bar engaging and moving rocks up the grate and means for driving the sprocket wheels, the improvement comprising:

a plurality of spacer members secured to a side of the cross bars opposed to the teeth, thereby preventing rocks of a size sufficient to cause a jamming of the machine from resting upon and being lifted by the opposed side of the crossbars.

6. An improvement as defined in claim 2, having a plurality of forwardly and downwardly extending "T" shaped ground chisels positioned at the forward end of the table, such that the ground chisels extend into the ground surface to direct rocks below the ground surface to the grate.

7. An improvement in a rock picking machine having a frame with ground wheels supporting the frame, and embodying a grate over which rocks are moved and discharged into a bucket rearwardly pivotally mounted on the frame, a table on which the grate is mounted being rearwardly pivoted on the frame to be movable between a rock picking position in relation to the ground and a position elevated from the ground, a conveyer forwardly pivotally mounted on the table for moving rocks up the grate, the conveyer including a conveyor frame, sprocket wheels rotatably mounted on the conveyer frame, chains trained over aligned sprocket wheels, conveyer cross bars fixed to the chains at intervals, teeth on the cross bars for engaging and moving rocks up the grate, and means for driving the sprocket wheels, the improvement comprising:

each of the teeth on the cross bars for engaging and moving rocks up the grate being generally "T" shaped with a top portion that engages rocks and a tail portion, a first clearance space being provided between adjacent top portions, a second clearance space being provided between adjacent tail portions, the second clearance space being larger than the first clearance space such that once a rock passes through the first clearance space increased clearance is encountered in the second clearance space thereby reducing the likelihood of the rock jamming between the adjacent teeth.

* * * * *